(12) United States Patent
Summers et al.

(10) Patent No.: US 11,368,786 B1
(45) Date of Patent: Jun. 21, 2022

(54) VEHICLE SPEAKER SYSTEM

(71) Applicants: Gary Summers, Santa Monica, CA (US); Derek Casari, Eugene, OR (US)

(72) Inventors: Gary Summers, Santa Monica, CA (US); Derek Casari, Eugene, OR (US)

( * ) Notice: Subject to any disclaimer, the term of this patent is extended or adjusted under 35 U.S.C. 154(b) by 0 days.

(21) Appl. No.: 17/205,272

(22) Filed: Mar. 18, 2021

(51) Int. Cl.
| | |
|---|---|
| *H04R 1/24* | (2006.01) |
| *H04R 1/02* | (2006.01) |
| *H04R 1/30* | (2006.01) |
| *H04R 1/32* | (2006.01) |
| *G10K 11/162* | (2006.01) |
| *B60R 11/02* | (2006.01) |
| *B60R 13/08* | (2006.01) |
| *B62D 65/14* | (2006.01) |
| *B60R 11/00* | (2006.01) |

(52) U.S. Cl.
CPC ............ *H04R 1/24* (2013.01); *B60R 11/0217* (2013.01); *B60R 13/0815* (2013.01); *B62D 65/14* (2013.01); *G10K 11/162* (2013.01); *H04R 1/025* (2013.01); *H04R 1/30* (2013.01); *H04R 1/323* (2013.01); *B60R 2011/0005* (2013.01); *H04R 2499/13* (2013.01)

(58) Field of Classification Search
CPC . H04R 1/24; H04R 1/025; H04R 1/30; H04R 1/323; H04R 2499/13; B60R 11/0217; B60R 13/0815; B60R 2011/0005; B62D 65/14; G10K 11/162
USPC .......................................................... 381/86
See application file for complete search history.

(56) References Cited

U.S. PATENT DOCUMENTS

| | | | |
|---|---|---|---|
| 4,503,930 A | | 3/1985 | McDowell |
| 5,966,453 A | | 10/1999 | Koyano et al. |
| 6,428,172 B1 | * | 8/2002 | Hutzel ...................... B60R 1/12 |
| | | | 359/872 |
| 8,073,156 B2 | | 12/2011 | Hutt et al. |
| 2004/0047476 A1 | | 3/2004 | Sato |
| 2004/0109575 A1 | | 6/2004 | Thigpen |
| 2005/0041819 A1 | * | 2/2005 | Brown ...................... B60Q 5/00 |
| | | | 381/86 |
| 2017/0169810 A1 | * | 6/2017 | Nesbit, Jr. .............. G10K 11/28 |

FOREIGN PATENT DOCUMENTS

CN 2798477 Y 7/2006

OTHER PUBLICATIONS

Website article "Where to mount speakers for best imaging" http://rftech.custhelp.com/app/answers/detail/a_id/29/~/where-to-mount-speakers-for-best-imaging, published Dec. 20, 1999, Updated Aug. 6, 2020.

* cited by examiner

*Primary Examiner* — Sean H Nguyen
(74) *Attorney, Agent, or Firm* — David G. Oberdick; Chiara F. Orsini

(57) ABSTRACT

The present invention encompasses systems and methods for mounting speakers in the front of a vehicle to address multiple issues that exist with audio systems currently on the market. More specifically, the present invention improves and optimizes the phase correct and time correct aspects of existing technologies.

18 Claims, 10 Drawing Sheets

Ear Height/Width Calculation Data

Common Anthropometric Measurements for the Seated Position.

| Measurement | Letter | Female 5th - 95th% | Male 5th - 95th% | Overall Range 5th - 95th% | |
|---|---|---|---|---|---|
| Sitting Height | A | 31.3" - 35.8" | 33.6" - 38.3" | 31.3" - 38.3" | |
| Sitting Eye Height | B | 42.6" - 48.8" | 46.3" - 52.3" | 42.6" - 52.6" | 47.6 Average |
| Waist Depth | C | 7.3" - 10.7" | 7.8" - 11.4" | 7.3" - 11.4" | |
| Thigh Clearance | D | 21.0" - 24.5" | 23.0" - 26.8" | 21.0" - 26.3" | |
| Buttock-to-Knee | E | 21.3" - 25.2" | 22.4" - 26.3" | 21.3" - 26.3" | |
| Knee Height | F | 19.8" - 23.2" | 21.4" - 25.0" | 19.8" - 28.0" | |
| Seat Length/Depth | G | 16.9" - 20.4" | 17.7" - 21.1" | 16.9" - 21.1" | |
| Popliteal Height | H | 15.0" - 18.1" | 16.7" - 19.9" | 15.0" - 19.9" | 17.45 Average |
| Seat Width | Not Shown | 14.5" - 18.0" | 13.9" - 17.2" | 13.9" - 18.0" | |

Table 2. Values for the 5th to 95th percentile males and females in the seated position used in designing seating. Use figure 4 for visualization. Data from BIFMA Ergonomics Guidelines, 2002. All measurements are in inches.

B - H = Average Sitting Eye Height
30.15" Average Eye Height

FIG. 6A

Ear Height/Width Calculation Data

Standing and Sitting Dimensions in Meters
BME 207 - Anthropometric Data
Adapted From RL Huston, Principles of Biomechanics (CRC Pr3ess 2009)

| Name | Dimension | 5th% | Male 50th% | 95th% | 5th% | Female 50th% | 95th% |
|---|---|---|---|---|---|---|---|
| Sitting Height | F | 0.859 | 0.927 | 0.975 | 0.797 | 0.853 | 0.911 |
| Eye Height (Sitting) | G | 0.743 | 0.800 | 0.855 | 0.892 | 0.743 | 0.791 |
| Upper Arm Length | H | 0.333 | 0.361 | 0.389 | 0.306 | 0.332 | 0.358 |
| Lower Arm + Hand Length | I | 0.451 | 0.483 | 0.517 | 0.396 | 0.428 | 0.458 |
| Upper Leg Length | J | 0.558 | 0.605 | 0.660 | 0.531 | 0.578 | 0.628 |
| Lower Leg Length | K | 0.506 | 0.553 | 0.599 | 0.461 | 0.502 | 0.546 |

770.25mm (30.32") = Average Seated Eye Level Male and Female

FIG. 6C

Ear Height/Width Calculation Data

The Aural Vision Michrophone Height Is Set At 30"

Human Eye Height Is Consistantly Higher Than Human Ear Canal Height

VEHICLE SPEAKER SYSTEM

BACKGROUND OF THE INVENTION

The present invention relates to automotive music, sound, and entertainment systems and, more specifically, to speaker configurations for use in automotive or vehicular sound systems (collectively referred to herein as "audio system(s)").

Audio systems are commonplace in automobiles, trucks, vans, sports utility vehicles, and all other vehicles (collectively "vehicles"). Such systems range from simple radios to elaborate configurations of high-tech CD, DVD, and Bluetooth systems with a variety of different speakers, amplifiers, equalizers, software up-mixers, etc. Regardless of the simplicity or complexity of the systems, many of these systems suffer from challenges related to the sound environment of the vehicle in which they are installed. Some of these problems include structuring a system within a small enclosed environment while addressing reverberations of sound; the number and location of sound-reflective surfaces (such as glass, metal, dashboards, etc.); the variability and location of sound-absorptive areas (such as seats and clothing, etc.); limited locations in which to install sound equipment around more essential automotive equipment; and the various angles that need to be addressed between the origin of the sound and the ears of the various vehicle occupants.

Some audio systems attempt to address these issues by allowing adjustments to the sound quality, such as adjustments to the treble or the base. Other systems come preprogrammed for sound adjustments based on the listener's location, such as "driver mode". Still other systems allow users to adjust the speakers from which the sound emanates. Finally, some vehicle owners will opt to install custom designed sound systems to address some or all of the problems associated with manufacturer-installed audio systems.

Any sound system, whether it is in a vehicle, home, recording studio or concert venue, must produce sound that exhibits the following criteria if the system is to accurately reproduce audio program material: (1) phase correct, (2) time correct, (3) timbre matched and (4) level matched. "Phase correct" refers to the relative phase alignment between the different speaker drivers through the shared parts of the audio spectrum at the prime listening position. "Time correct" refers to the time arrival of all frequencies of the audio spectrum at the prime listening position. "Timbre matched" refers to the relative spectral balance of each audio channel at the prime listening position. Generally, sounds may be characterized by pitch, loudness and quality. Sound "quality" or "timbre" describes those characteristics of sound which allow the ear to distinguish sounds which have the same pitch and loudness. Timbre is a general term for the distinguishable characteristics of a tone. "Level matched" refers to the relative level in sound pressure level ("SPL") of each speaker driver measured at the prime listening position. The present invention, among other things, improves and better optimizes the characteristics of being phase correct and time correct in audio systems.

Most speakers and speaker systems today are designed to incorporate separate drive units in different locations to provide sound across the frequency spectrum. Many speaker manufacturers take individual, separate drive units, and place them in a single box or in several boxes to create a full range system. However, as soon as you divide the audio signal into separate sections and transmit it from different points in space all sorts of problems occur that prevent the sound from satisfying the 4-part test of being (1) phase correct, (2) time correct, (3) timbre matched and (4) level matched.

Concentric, coaxial speakers, by their design, are phase correct and time correct. In simple terms, a concentric, coaxial speaker is a speaker in which the individual driver units radiate sound from the same point or axis. These speakers are commonly referred to as both concentric, coaxial speakers and point source speakers and are collectively referred to herein as "concentric, coaxial speakers". An example of such a speaker is embodied in Chinese Patent No. CN2798477Y, entitled "Coaxial array horn speakers" and The Singled-Point Concentric™ Technology (Patent No. ZL200420089900 to Shenzhen SV Technology Co., Ltd). Concentric, coaxial speakers provide for a full range of sound that is more realistic and acoustically true than separate speakers. By incorporating concentric, coaxial speakers into a vehicular speaker system, the present invention solves many of the problems that are inherent in attempting to produce accurate, high-resolution sound inside a vehicle. The present invention also is designed to be incorporated into the traditional layout of many vehicles; thus, it does not require elaborate and expansive customization to provide a higher quality sound experience inside a vehicle. These and several other advantages are described and claimed herein.

BRIEF SUMMARY OF THE INVENTION

The present invention encompasses systems and methods for locating speakers in a vehicle. One embodiment of the present invention is a speaker system for use in a vehicle that has a windshield and a dashboard (with the dashboard having a driver side and a passenger side) comprising the placement of at least two concentric, coaxial speakers located where the windshield meets the dashboard. Each concentric, coaxial speaker is housed in a sealed enclosure.

Another embodiment of a speaker system (for use in a vehicle having a windshield and a dashboard with a driver side and a passenger side) comprises at least two concentric, coaxial speakers, each speaker in a sealed enclosure and mounted in a location where the windshield meets the dashboard. In this embodiment, the windshield and dashboard operate to form an acoustic horn or waveguide for each speaker.

Another embodiment of a speaker system has at least one concentric, coaxial speakers located and mounted on the driver side of the dashboard and at least one concentric, coaxial speaker located and mounted on the passenger side of the dashboard.

Another embodiment of a speaker system comprises at least three concentric, coaxial speakers such that one speaker is located toward the driver side of the dashboard, and a second speaker is located toward the passenger side of the dashboard and a third concentric, coaxial speaker located near the center of the dashboard.

Any embodiment of the present invention can incorporate coating or covering at least some portion of the dashboard with an acoustically absorbent material (or designing the dashboard to be made from an acoustically absorbent material). Additionally, any embodiment of the present invention can include shaping or designing at least one portion of the dashboard to resemble an acoustic horn or waveguide more closely.

A method of installing a speaker in a vehicle that has a windshield and a dashboard with a driver side and a passenger side, comprises mounting at least one concentric, coaxial speaker where the windshield meets the dashboard. An alternative method also comprises having the concentric, coaxial speaker(s) in a sealed enclosure and mounted in a location where the windshield meets the dashboard. Additionally, for this embodiment, the windshield and dashboard operate to form an acoustic horn or waveguide for each speaker.

An alternative embodiment of a speaker system for use in a vehicle having a windshield and a dashboard (with a driver side and a passenger side) comprises at least one concentric, coaxial speaker mounted in a sealed enclosure where the windshield meets the dashboard. In this embodiment, the windshield and dashboard operate to form an acoustic horn or waveguide for the speaker.

BRIEF DESCRIPTION OF THE SEVERAL VIEWS OF THE DRAWINGS

For the purpose of facilitating understanding of the invention, the accompanying drawings and description illustrate preferred embodiments thereof, from which the invention, various embodiments of its structures, construction and method of operation, and many advantages, may be understood and appreciated. The accompanying drawings are hereby incorporated by reference.

FIGS. 6A through 6E provide tables and details illustrating various calculations of ear height and width, which are relevant to the placement of components of one embodiment of the present invention.

DETAILED DESCRIPTION OF THE INVENTION

Figure 1:
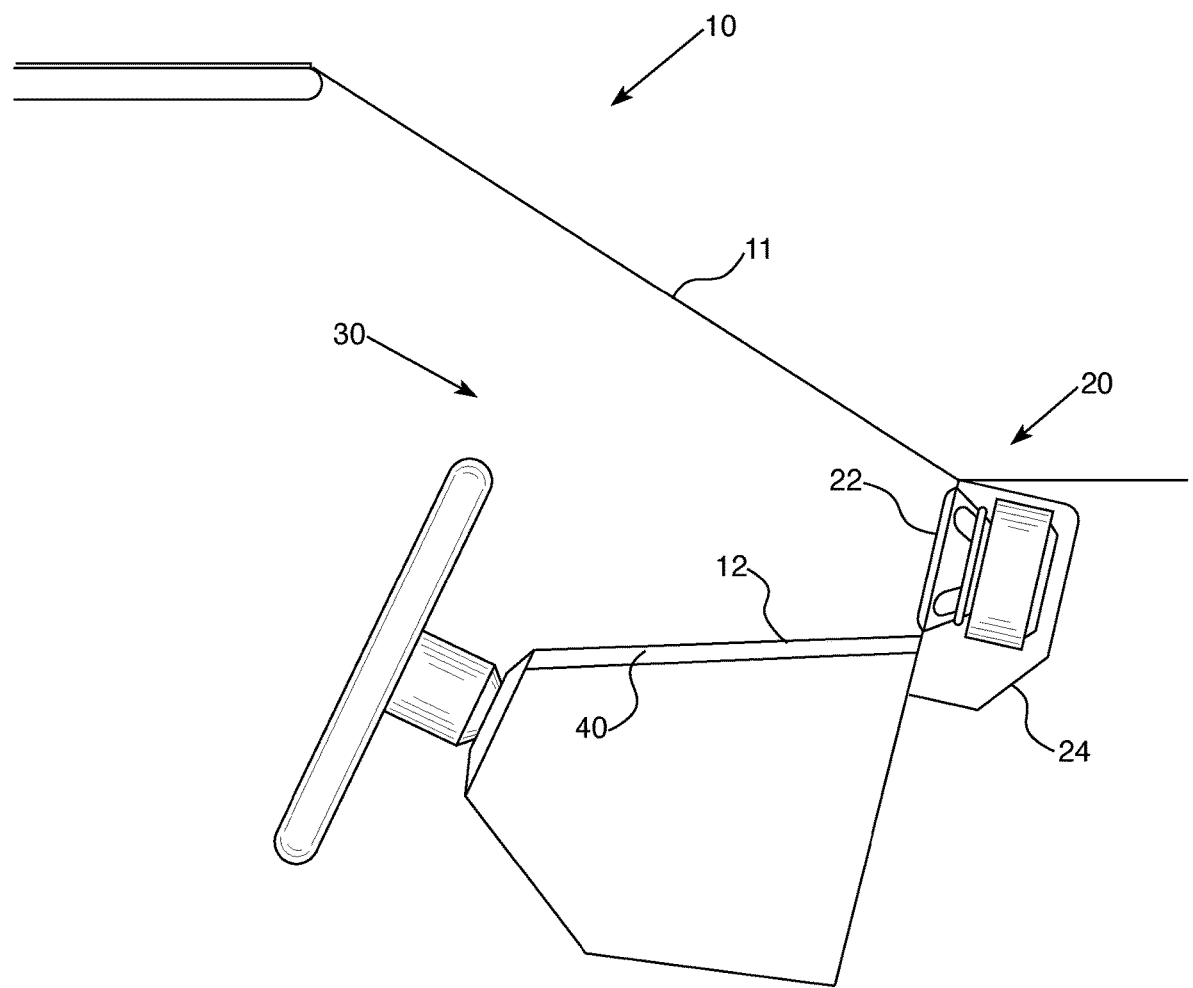
FIG. 1 is a cross-sectional side view of one embodiment of the present invention's speaker system incorporated into a vehicle dashboard.

The following describes example embodiments in which the present invention may be practiced. This invention, however, may be embodied in many different ways, and the descriptions provided herein should not be construed as limiting in any way. Among other things, the following invention may be embodied as methods, systems or devices. The following detailed descriptions should not be taken in a limiting sense. The accompanying drawings are hereby incorporated by reference.

In this document, the terms "a" or "an" are used, as is common in patent documents, to include one or more than one. In this document, the term "or" is used to refer to a nonexclusive "or" such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

While the disclosure has been described in detail and with reference to specific embodiments thereof, it will be apparent to one skilled in the art that various changes and modifications can be made therein without departing from the spirit and scope of the embodiments. Thus, it is intended that the present disclosure covers the modifications and variations of this disclosure provided they come within the scope of the appended claims and their equivalents.

The methods 50 and speaker systems 20 of the present invention address multiple issues that exist with audio systems currently on the market. More specifically, the present invention improves and optimizes the phase correct and time correct aspects of existing technologies. The present invention achieves a phase and time correct alignment by utilizing, in one embodiment, at least one concentric, coaxial speaker 22. The concentric, coaxial speaker 22, by its very design, is time and phase correct. By placing a hi-frequency driver in the throat of a midrange driver and aligning the voice coils of the speaker 22 to share the same physical alignment, the sound produced by the concentric, coaxial speakers 22 are time and phase correct.

In general, vehicle manufacturers currently do not and have not incorporated the use of concentric, coaxial speakers 22 into vehicular audio systems. Existing technologies and designs use separate high- and mid-frequency speakers placed in different locations in the vehicle interior. To the extent that existing technologies use anything that approximates a concentric, coaxial speaker 22, it is not truly concentric because the high-frequency and mid-frequency speakers' voice coils are not in proper alignment. Therefore, existing technologies are not in-phase or in-time. When an audio system is not phase and time correct, it is impossible for the human ear to decode the audio information properly and correctly. This impacts the sound quality and user enjoyment of the audio system.

The various embodiments of the present invention encompass speaker systems 20 and methods 50 of mounting speakers 22 and related equipment in vehicles 10 to optimize the sound quality within this challenging environment for high-quality sound projection.

Figure 6B:
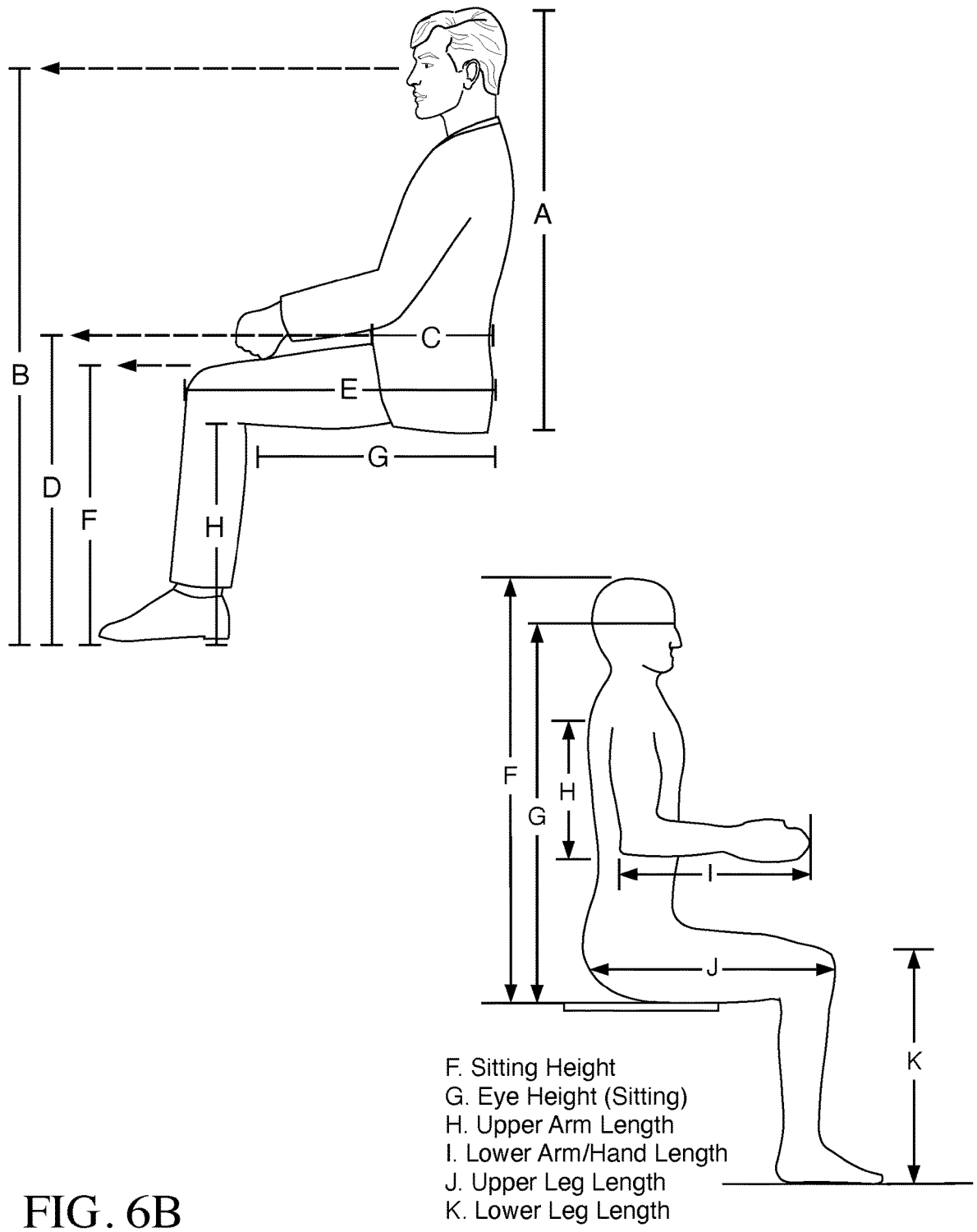
Figure 6D:
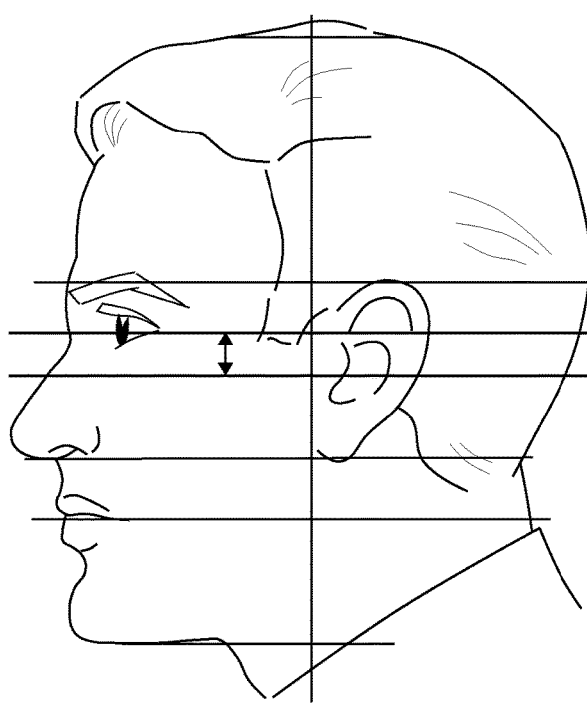
Figure 6D:
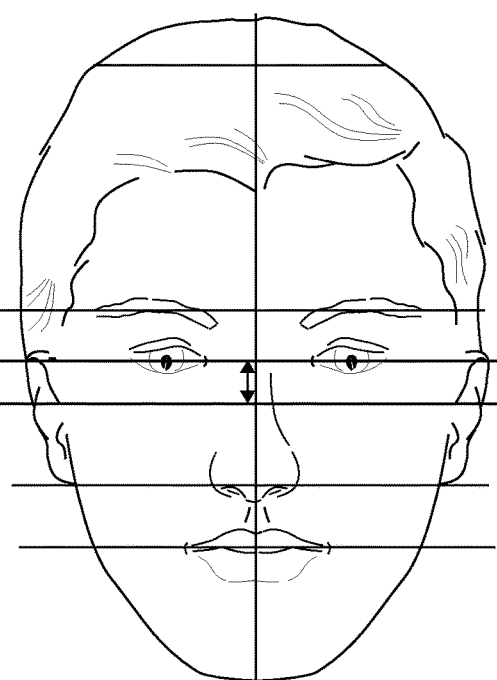

To better understand the present invention and its advantages, it is useful to understand the placement and location of the operator 60 within the interior of most vehicles 10. The terms "operator" and "driver" are used interchangeably herein to refer to the human operator 60 or driver 60 of a vehicle 10. As shown in more detail in FIGS. 6A through 6C, the average seated eye level for males and females is 770.25 mm (30.32 inches). The average eye height is 30.15 inches (see FIG. 6A). As shown in FIG. 6D, human eye height is consistently higher than human ear canal height. The conventional method currently used for aligning an audio system is to place one or more instrumentation microphones at the prime listening position. A test tone is played, typically "pink noise", through the specific speaker or speakers being tested. The sound is picked up by the microphones and sent to an audio analyzer that plots a time averaged spectral frequency response curve. Thus, it is imperative that the microphones are placed where the listener's ears will be. Therefore, when tuning or adjusting the sound from systems of the present invention, the height of the microphone (used for tuning), according to one embodiment of the present invention, is set at 30-inches, which accommodates most operators 60. Alternative embodiments of the present invention may be customized for specific operators 60 by using a specific operator's eye level and/or ear canal height to optimize the location of the microphone. Alternatively, the location of parts of this speaker system 20 may be determined using the averages or means of different heights of various groups of people.

Figure 6E:
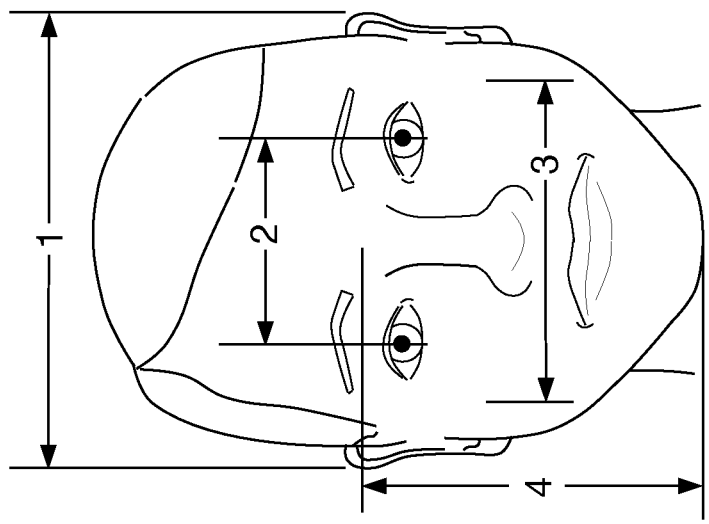

Additionally, as shown in further detail in FIG. 6E, average head width for an adult is 5.83 inches. Therefore, the microphone width according to one embodiment of the present invention is set at 6.0 inches for purposes of tuning the system, which accommodates most operators 60. Alternative embodiments of the present invention may be customized for specific operators 60 by using a specific operator's head width. Again, the location of parts of this speaker system 20 may be determined using the averages or means of different heights of various groups of people.

Preferred embodiments of both the speaker system 20 and the installation method 50 of this invention includes the following components: (1) at least one but preferably at least two concentric, coaxial speakers 22 that are (2) located in a vehicle 10 where the dashboard 12 and windshield 11 meet; (3) each concentric, coaxial speaker 22 is located in a sealed enclosure 24; and (4) optionally, but preferably, the dashboard 12 is treated with an acoustically absorbing material 40. The dashboard 12 of every vehicle 10 has a driver side 13 and a passenger side 14. For many embodiments of the present invention incorporating at least two concentric, coaxial speakers 22, one speaker 22 is located near the driver side 13 of the dashboard 12 and one speaker 22 is located near the passenger side 14 of the dashboard 12.

The first element of these embodiments is the use of at least one concentric, coaxial speaker 22. To further elaborate on the benefits of concentric, coaxial speakers 22 beyond that which is provided in the BACKGROUND section, the benefit of such speakers 22 comes from their having a hi-frequency driver mounted at the same plane (and in the throat of) the mid-range driver (FIGS. 5A and 5B) so the sound from these two speakers 22 originates from a common point. Additionally, in this design, the mid-range driver acts as a waveguide 30 to the hi-frequency driver, controlling the directivity of the hi-frequency driver. This design is illustrated in FIGS. 5A and 5B.

Figure 5A:
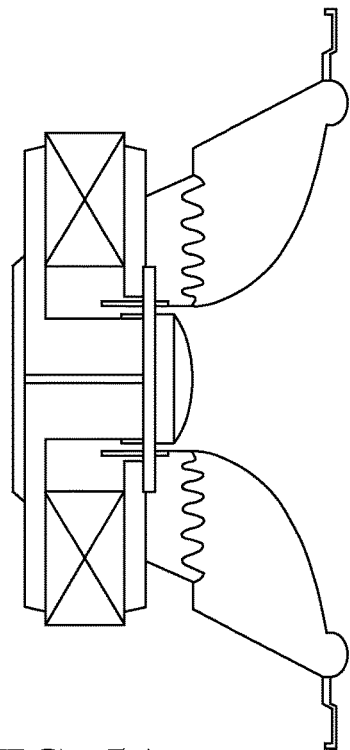
FIGS. 5A and 5B illustrate cross-sectional perspectives of one embodiment of a speaker according to the present invention and FIG. 5C shows illustrations of frequencies and amplitudes.
Figure 5B:
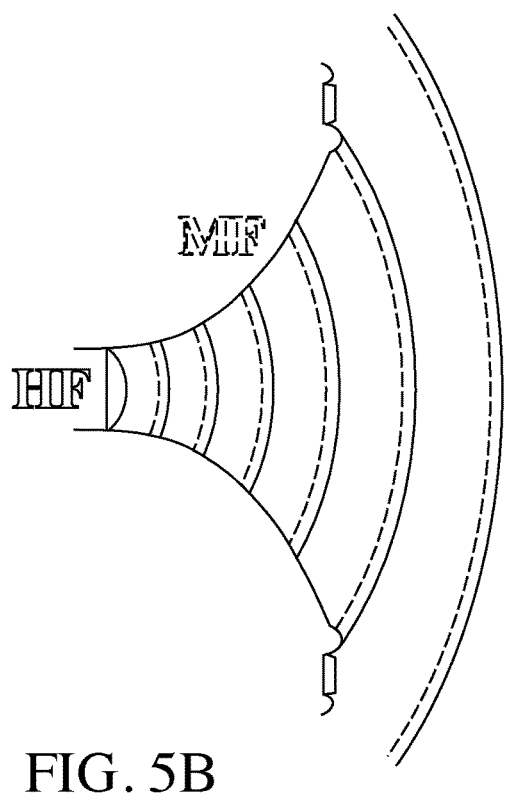
Figure 5C:
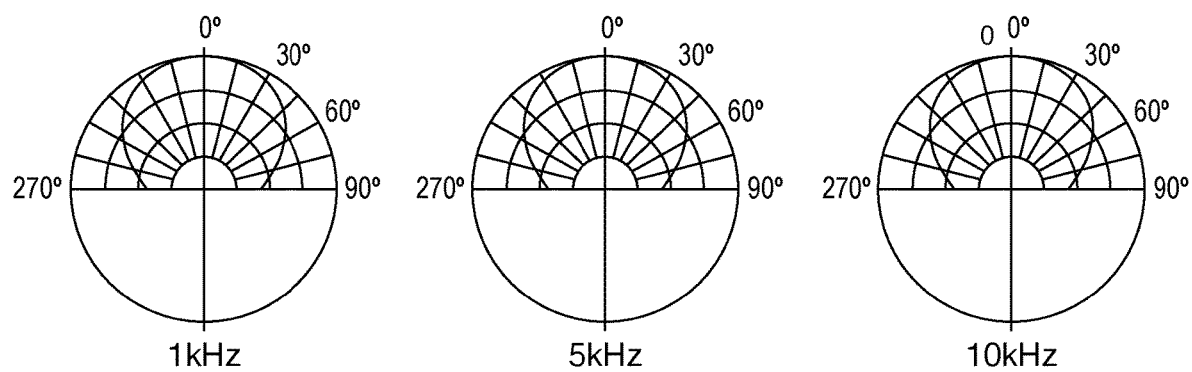

Additionally, as illustrated in FIG. 5A, the driver voice coils share the same vertical and horizontal alignment, which yields a single-point coherent wave front. The speaker phase is maintained through the reproduced frequencies, most importantly through the crossover region. This design improves the sound harmonics, results in clearer sound, and reduces sound distortion as compared to traditional speakers. FIG. 5C illustrates how constant directivity is maintained with respect to frequency and amplitude regardless of the radiation angle.

Concentric, coaxial speakers' reduction of sound distortion is due in part to the incorporation of constant directivity horns, which control the acoustic dispersion from the driver(s). This provides for even coverage at all frequencies at the target area. Controlling the directivity also allows the sound from a speaker to be more precisely targeted at the listener.

Concentric, coaxial speakers 22 also, by their design, produce a more consistent conical directivity pattern across a wider range of frequencies. This results in clearer and more accurate sound reproduction at the target location. This preferred embodiment of the present invention employs at least two, but possibly three or more, concentric, coaxial speakers 22 designed, installed and located as described below to control the direction of the sound and to produce a clearer and truer sound quality.

Concentric, coaxial speakers 22 can be designed and made in a variety of sizes. The present invention includes the use of any size concentric, coaxial speaker 22 to achieve the optimum sound quality in a given vehicle 10 and/or to meet any other design or manufacturing requirements (including but not limited to minimizing the amount of customization in the design of a vehicle 10, fitting into and around other vehicle components located in or near the windshield 11 and dashboard 12, optimizing the cost and/or price of the speaker system 20, etc.) For many applications, 3-inch concentric, coaxial speakers 22 will balance the needs of vehicle manufacturers with the desire to produce cleaner, purer, less muddled sound in a vehicle 10.

The at least two concentric, coaxial speakers 22 are each located within a pseudo-acoustic horn 30 or waveguide 30. A traditional acoustic horn 30 is a tapered sound guide designed to provide an acoustic impedance match between a sound source and free air. This maximizes the efficiency with which sound waves from the source are transferred to the air. A horn 30 also increases the level of the sound traveling through the horn 30 and provides for predictable directivity control of the sound. The walls of a horn 30 restrict the spreading of the sound waves such that the sound can be focus at its target location and kept out of areas where it is not desired. These attributes of a horn 30 are incorporated into preferred embodiments of the present invention and contribute to the invention's ability to produce clear sound at the location of the vehicle operator 60 and/or passenger.

The concentric, coaxial speakers 22 are located along the front of the vehicle 10 where the windshield 11 meets the dashboard 12 (also referred to herein as the "apex" 16 of the windshield 11 and dashboard 12). The apex 16 of the windshield 11 and the dashboard 12 is that narrowed or pointed convergence of the planes of the windshield 11 and the dashboard 12. This is shown most clearly in FIGS. 1 and 2 and is also illustrated in FIGS. 3 and 4. In this location, the windshield 11 and the dashboard 12 form a pseudo-acoustic horn 30 having at least two "sides" (i.e. a top created by the windshield 11 and a bottom created by the dashboard 12.) In some vehicles 10, the dashboard 12, windshield 11 and/or other components of the front, interior of the vehicle 10 can be designed to provide for a more complete horn shape 30 having more or all of the sides of a traditional horn 30. This placement of the concentric, coaxial speakers 22 at the apex 16 of where the windshield 11 meets the dashboard 12 enables the creation and utilization of a horn-shape 30 without the additional expense and manufacturing complexities of creating true acoustic horns 30 around the concentric, coaxial speakers 22 because the placement utilizes the existing structures within most vehicles 10. This placement also helps to increase the speaker 22 output level and reduces forward cabin reflections. Increasing a speaker's output also is desirable because, if one can acoustically raise the output of the speaker 22, then the speaker 22 requires less power to achieve a given SPL as opposed to a speaker 22 that is not mounted in a horn 30. Optional further customization of the structures surrounding the concentric, coaxial speakers 22 to create a more perfect horn 30 will further improve the quality of the sound at the operator's or listener's position inside the vehicle 10.

Each of the concentric, coaxial speakers 22 is located in a sealed enclosure 24 that seals the back of the speaker 22 off from the front of the speaker 22. The sealed enclosures 24 serve primarily two purposes: (1) the sealed enclosures 24 control the rear or backward waves; and (2) the sealed enclosures 24 increase the power handling of the speakers 22. The sealed enclosure 24 of the present invention can be achieved by designing the speakers 22 to have an independent enclosure 24 such that the speaker 22 and its enclosure 24 are installed in the vehicle 10. Alternatively, the enclosure 24 may be a part of the design of the vehicle 10, such that the speakers 22 are installed into an enclosure 24 that is (at least in part) an existing structure in the front of the vehicle 10. A non-limiting example for some speakers, such as a mid-base speaker 26 or subwoofer 28 would be to have at least one side of the enclosure 24 be a portion of the vehicle's firewall. The enclosure 24 prevents sound waves generated by the rearward-facing surface of the diaphragm of an open speaker driver from interacting with sound waves generated at the front of the speaker driver. The forward- and rearward-generated sounds are out of phase with each other. Therefore, if the rearward sounds permeate into the listing space they will cause a distortion of the original signal as it was intended to be reproduced. Additionally, because the forward- and rearward-sound waves travel different paths to and through the listening space, the sound waves in an unenclosed speaker 22 arrive at the listener or the target position at slightly different times, resulting in unintended (and undesirable) echo and reverberation. This results in a muddling of the sound that is produced by the speakers 22. By locating the concentric, coaxial speakers 22 of the present invention in sealed enclosures 24, the effects of rearward sound waves are mitigated.

The sealed enclosure 24 also traps a volume of air inside of it. The relationship between the characteristics of the speaker 22 and the volume of air inside the sealed enclosure 24 impact the performance of the speaker 22 and the production of high-fidelity sound. Therefore, the size of the enclosure 24 and the volume of air inside of it can be used to increase the power handling of the speaker 22 and/or to modify the quality of the sound emanating from the speaker 22.

The present invention, in one preferred embodiment, comprises the use of at least two concentric, coaxial speakers 22, each of which is in a sealed enclosure 24 and each of which is located in the front of a vehicle 10 where the windshield 11 meets the dashboard 12 (one speaker 22 toward the driver side 13 and one toward the passenger side 14). The use of this type of speaker 22 designed and located in this manner will produce a cleaner, clearer, more acoustically true sound that what is currently on the market in many vehicles 10. However, this design can be further optimized by also coating, covering or treating the dashboard 12 with an acoustically absorbent material 40 or manufacturing the dashboard 12 (or parts of the dashboard 12) from an acoustically absorbent material 40. Covering the dashboard 12 with acoustically absorbent material 40 further reduces unwanted forward reflections. The reduction of the forward reflected sound is important because reflected sound will arrive at the listening position at a later time interval than direct sound. This will cause unwanted phase issues and will make it difficult for the brain to decode the audio data. This phenomenon can be avoided by mitigating this reflected sound at its point of first reflection, which is at the dashboard 12.

For most purposes, the use of two concentric, coaxial speakers 22 in a speaker system 20 of the design and location described herein provides sound that is significantly improved over existing vehicle sound systems. These two speakers 22 are located on opposites sides of the front of the vehicle 10 (one speaker 22 toward the driver side 13 and one toward the passenger side 14) and positioned to optimize the sound at the listener's location as shown in FIGS. 3 and 4. Another embodiment of the present invention incorporates a third central, concentric, coaxial speaker 22 of the designed described herein, which is located toward the center 15 of the vehicle's front dashboard 12 between the driver and front passenger location (also shown in FIGS. 3 and 4). The use of three speakers 22 enables the creation of 5.1 surround sound wherein the third, central speaker 22 provides closer to perfect sound at both the driver location and at the front passenger location. The present invention encompasses the use of any number of enclosed, concentric, coaxial speakers 22 located at the apex 16 of the windshield 11 and dashboard 12.

Figure 2:
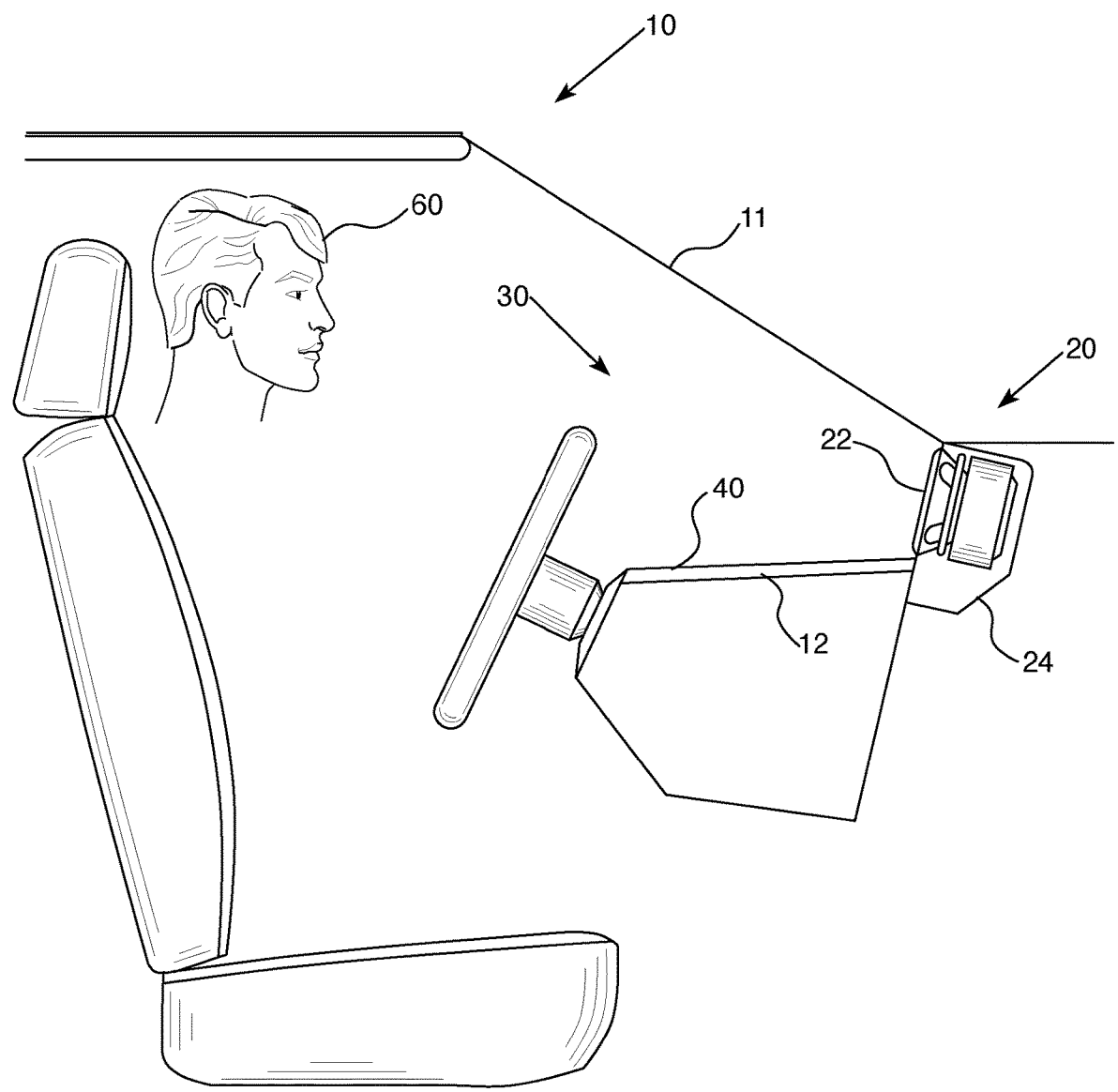
FIG. 2 is another cross-sectional side view of one embodiment of the present invention's speaker system showing a potential driver location within the vehicle.
Figure 3:
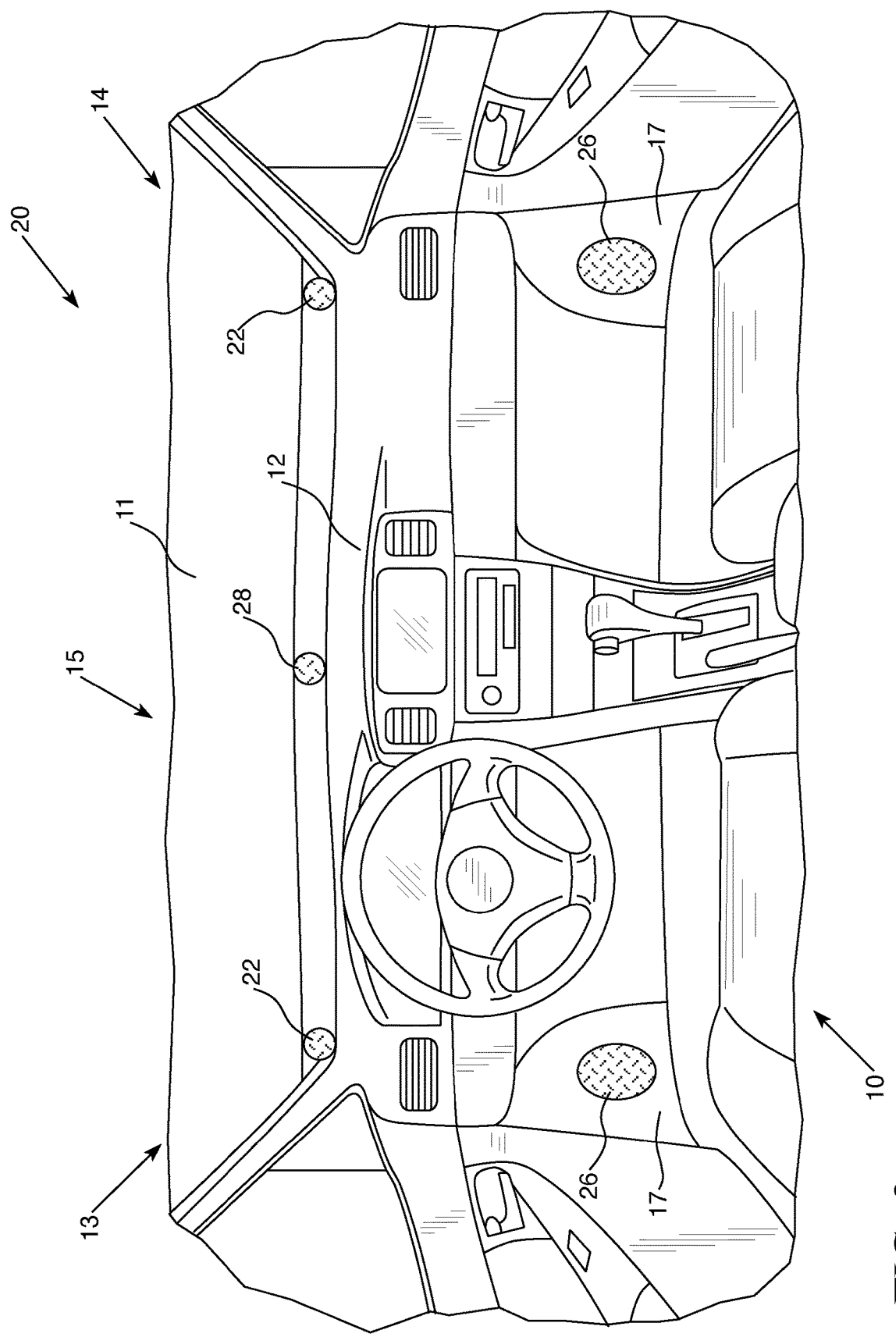
FIG. 3 shows a front view of a dashboard and an interior front of a vehicle with the placements of one embodiment of the present invention's speaker system.
Figure 4:
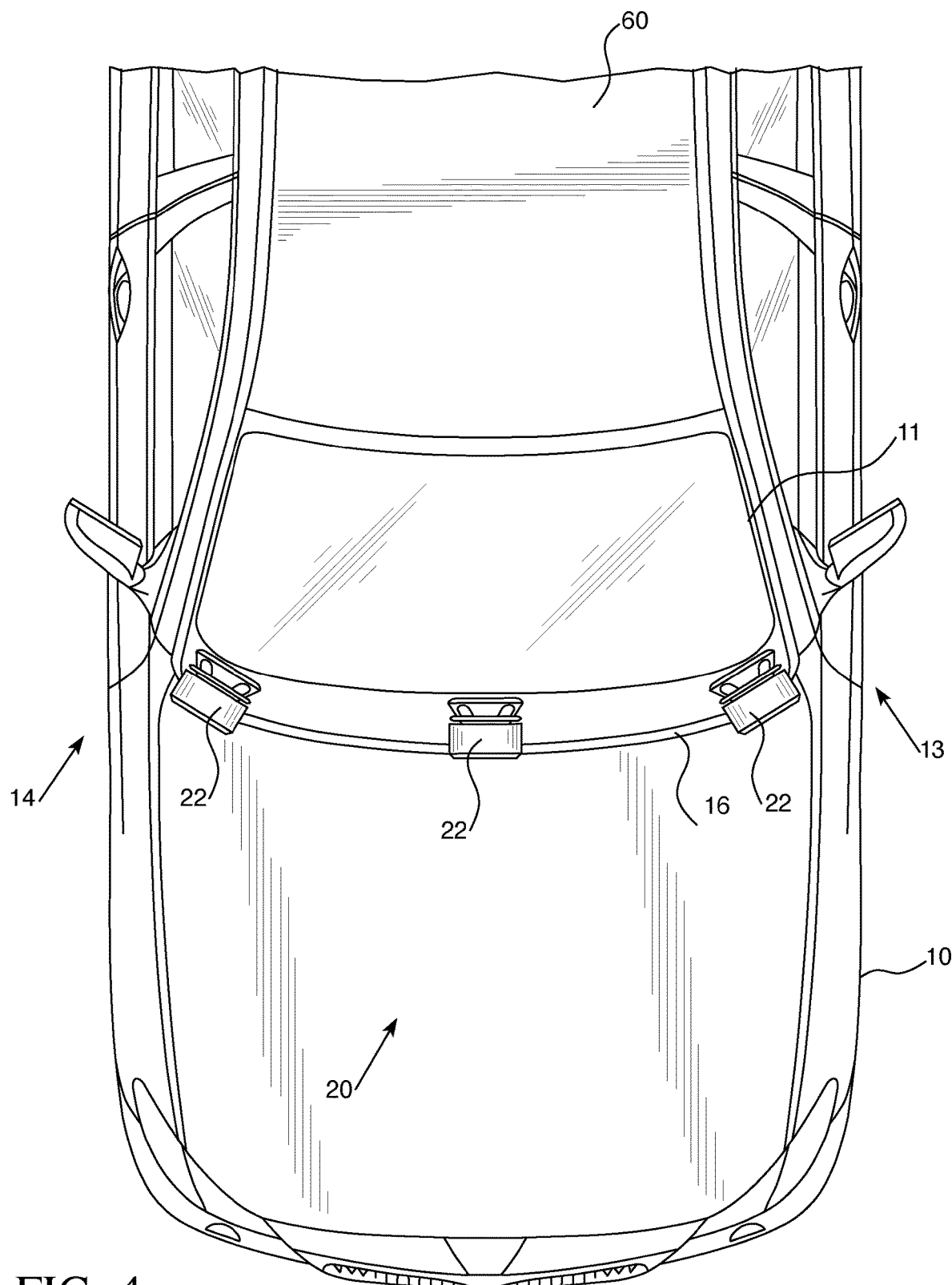
FIG. 4 is a top-down view of the location of the speakers in the front of a vehicle according to one embodiment of the present invention's speaker system.

One embodiment of a speaker system 20, method of installing speakers 50 and method of locating speakers 70 according to the present invention is shown in FIGS. 1 through 4. At least one, preferably two, and optionally three, concentric, coaxial speakers 22 are mounted in sealed enclosures 24 located at the apex 16 of the windshield 11 and the dashboard 12 and aimed to the specifications outlined herein. FIGS. 1, 2 and 4 illustrate one embodiment of a speaker 22 aiming and locating method 70 of the present invention. As shown in FIG. 3, one embodiment of the present invention places three concentric, coaxial speakers 22 approximately equal distance along the apex 16 of the windshield 11 and the dashboard 12. The aiming/locating of the speaker 22 is important because every speaker 22 exhibits a radiation pattern. The vehicle environment is a confined space with many closely located reflective surfaces. The object of one embodiment of the present invention is to aim the radiation pattern of a speaker 22 such that the direct sound is targeted at the listening position and encounters as few reflective surfaces as possible. Another advantage of utilizing the concentric, coaxial speakers 22 is that the speaker 22 itself controls the directivity of the radiated sound.

When incorporating the present invention into vehicle audio systems that have additional speakers in various locations inside the vehicle 10, it is preferable to have speakers share the same vertical plane whenever possible because this results in better alignment of the speaker drivers with respect to phase and time. In home audio systems, this is achieved by having the speakers mounted on a flat baffle and placed in the same vertical plane. However, it is significantly more difficult to achieve a comparable alignment in a vehicle 10. One embodiment of the present invention overcomes such difficulties by placing the mid-bass speakers 26 in the front footwell 17 so that they share the same vertical plane as the concentric, coaxial speakers 22 designed and located according to the present invention (illustrated in FIG. 1).

Another embodiment of the present invention, as shown in FIG. 3, incorporates a subwoofer 28 mounted in a sealed enclosure 24 in and behind the dashboard 12 with the present invention's at least two enclosed, concentric, coaxial speakers 22 located at the apex 16 of the windshield 11 and dashboard 12. One method of mounting the subwoofer 28 is to secure it to the firewall.

The present invention also encompasses various embodiments of methods of installing 50 a speaker in a vehicle 10, wherein the vehicle 10 has a windshield 11 and a dashboard 12 with a driver side 13 and a passenger side 14. These installation methods 50 comprise mounting at least one concentric, coaxial speaker 22 where the windshield 11 meets the dashboard 12.

Various embodiments of these methods 50 involves the concentric, coaxial speakers 22 each being in a sealed enclosure 24 and being mounted in a location where the windshield 11 meets the dashboard 12. For this embodiment, the windshield 11 and dashboard 12 operate to form an acoustic horn 30 or waveguide 30 for each speaker 22.

One embodiment of the method 50 of installing a speaker 22 comprises mounting one concentric, coaxial speaker 22 on the driver side 13 of the dashboard 12 and a second concentric, coaxial speaker 22 on the passenger side 14 of the dashboard 12. An alternative method 50 includes mounting a third concentric, coaxial speaker 22 near the center 15 of the dashboard 12.

Any variation of the methods 50 presented herein can include covering all or portions of the dashboard 12 with an acoustically absorbent material 40 or making all or portions of the dashboard 12 from acoustically absorbent material(s) 40. Additionally, any variation of the methods 50 presented herein can include designing, manufacturing or forming some portion or all of the dashboard 12 into the shape of an acoustic horn 30.

More specific variations of the installation method(s) 50 of the present invention include the use of at least one 3-inch concentric, coaxial speaker 22. Additional variations incorporate mounting at least one mid-bass speaker 26 in a vehicle's front footwell 17 in vertical alignment with at least one concentric, coaxial speaker 22. Additional alternative embodiments of the methods 50 can incorporate mounting a subwoofer 28 in a sealed enclosure 24 and located behind the dashboard 12.

What is claimed is:

1. A speaker system for use in a vehicle having a windshield and a dashboard with a driver side and a passenger side, the speaker system comprising at least two concentric, coaxial speakers, each speaker in a sealed enclosure and each speaker mounted in a location where the windshield meets the dashboard; and
   whereby the windshield and dashboard operate to form an acoustic horn or waveguide for each speaker.

2. The system of claim 1, wherein the at least two concentric, coaxial speakers comprise a concentric, coaxial speaker located and mounted on the driver side of the dashboard and a concentric, coaxial speaker located and mounted on the passenger side of the dashboard.

3. The system of claim 1, also comprising a third concentric, coaxial speaker located and mounted near the center of the dashboard.

4. The system of claim 1, wherein a portion of the dashboard is covered by or comprised of an acoustically absorbent material.

5. The system of claim 1, wherein a portion of the dashboard associated with at least one concentric, coaxial speaker is configured in the shape of an acoustic horn.

6. The system of claim 1, wherein the at least two concentric, coaxial speakers are 3-inch speakers.

7. The system of claim 1, also comprising a subwoofer in a sealed enclosure and located behind the dashboard.

8. A method of installing a speaker in a vehicle that has a windshield and a dashboard, with a driver side and a passenger side, comprising mounting at least one concentric, coaxial speaker where the windshield meets the dashboard.

9. The method of claim 8, wherein the at least one concentric, coaxial speaker is in a sealed enclosure and is mounted in a location where the windshield meets the dashboard, and whereby the windshield and the dashboard operate to form an acoustic horn or waveguide for each speaker.

10. The method of claim 8, comprising mounting one concentric, coaxial speakers on the driver side of the dashboard and mounting a second concentric, coaxial speaker on the passenger side of the dashboard.

11. The method of claim 10, also comprising mounting a third concentric, coaxial speaker near the center of the dashboard.

12. The method of claim 8, also comprising covering at least a portion of the dashboard with an acoustically absorbent material or manufacturing at least a portion of the dashboard from an acoustically absorbent material.

13. The method of claim 8, also comprising configuring at least a portion of the dashboard associated with at least one concentric, coaxial speaker into the shape of an acoustic horn.

14. The method of claim 8, wherein the at least one concentric, coaxial speaker is a 3-inch speakers.

15. The method of claim 8, also comprising mounting at least one mid-bass speaker in a vehicle's front footwall in vertical alignment with the at least one concentric, coaxial sneaker.

16. The method of claim 8, also comprising mounting a subwoofer in a sealed enclosure behind the dashboard.

17. A speaker system for use in a vehicle having a windshield and a dashboard with a driver side and a passenger side, the speaker system comprising at least one concentric, coaxial speaker mounted in a sealed enclosure and located where the windshield meets the dashboard; and
   whereby the windshield and dashboard operate to form an acoustic horn or waveguide for the speaker.

18. The system of claim 2, also comprising at least one mid-bass speaker located a vehicle's front footwall in vertical alignment with at least one concentric, coaxial speaker.

* * * * *